March 3, 1959 L. L. CUMMINGS 2,875,775
GAS LIFT VALVE
Filed May 25, 1953 2 Sheets-Sheet 1
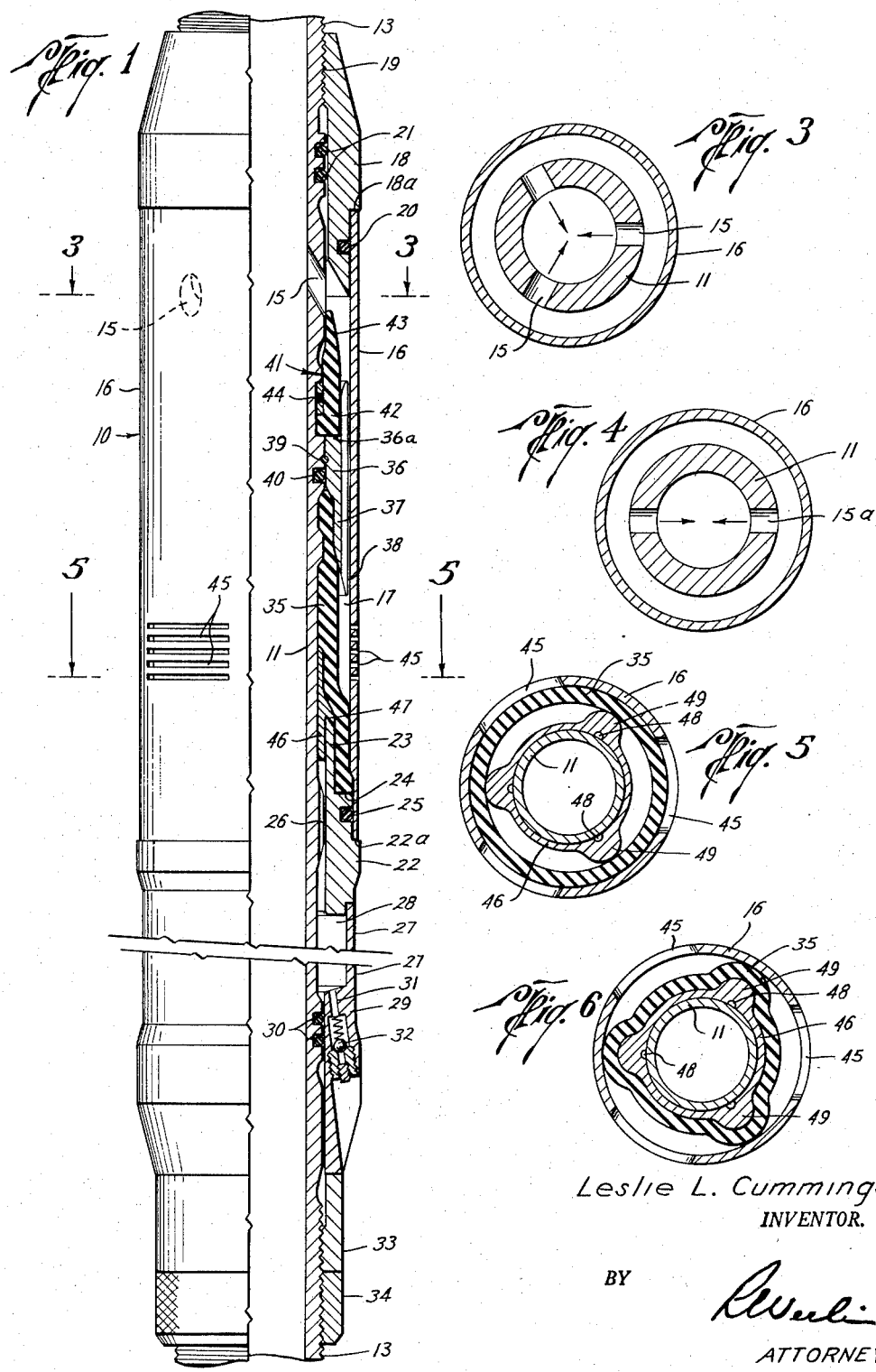
Leslie L. Cummings
INVENTOR.
BY
ATTORNEY March 3, 1959  L. L. CUMMINGS  2,875,775
GAS LIFT VALVE
Filed May 25, 1953  2 Sheets-Sheet 2
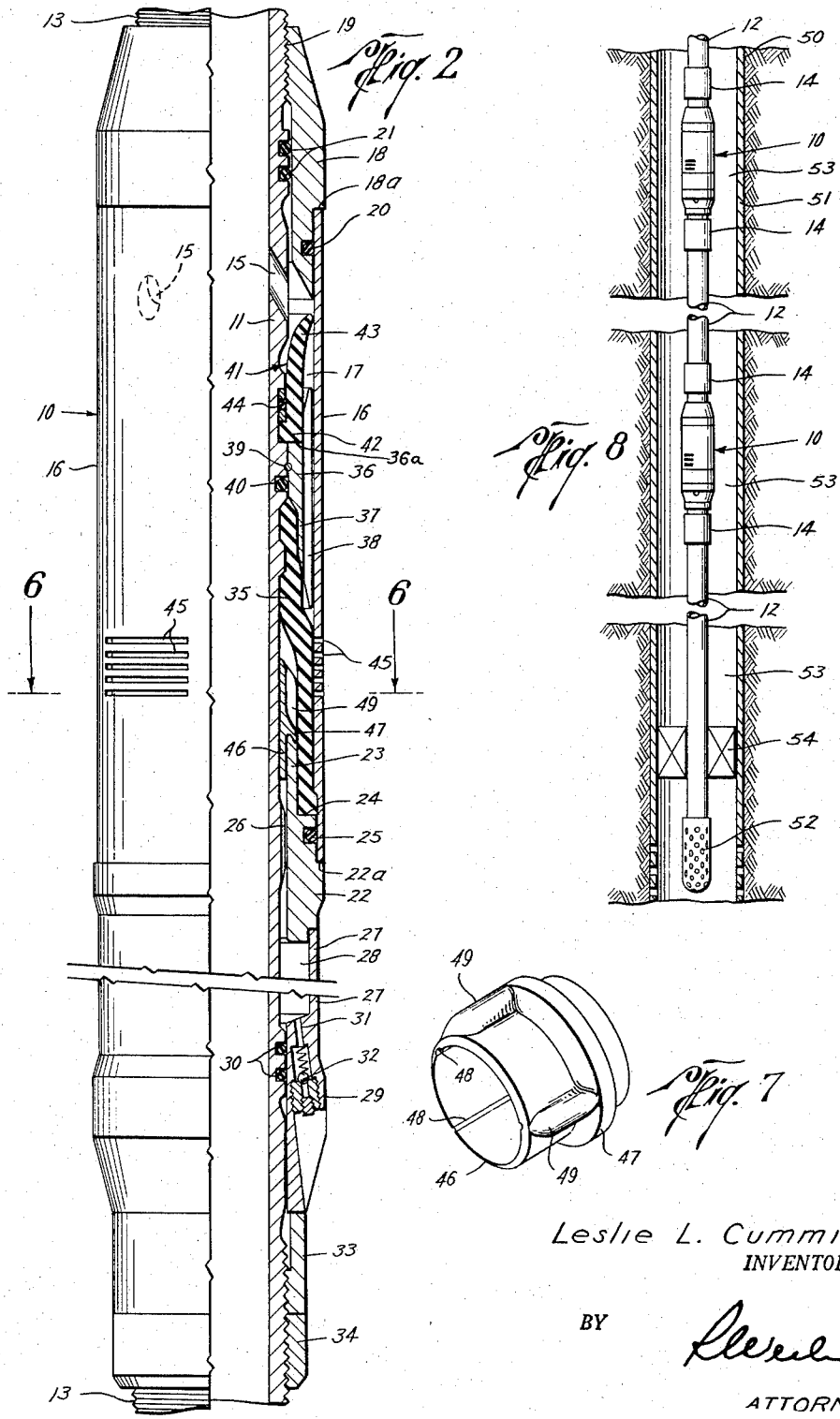
Leslie L. Cummings
INVENTOR.
BY
ATTORNEY

United States Patent Office 2,875,775
Patented Mar. 3, 1959

2,875,775

GAS LIFT VALVE

Leslie L. Cummings, Houston, Tex., assignor, by mesne assignments, to Otis Engineering Corporation, Dallas, Tex., a corporation of Texas Application May 25, 1953, Serial No. 357,024

4 Claims. (Cl. 137—155)

This invention relates to gas-lift valves for use in oil wells and the like for controlling the admission of gas or air into a column of fluid in a well to lift the column and aid in flowing the fluid from the well.

This application is a continuation-in-part of my co-pending application Serial No. 216,381, filed March 19, 1951, now Patent No. 2,642,889, June 23, 1953.

In conventional gas lift systems, the well equipment includes a string of relatively small pipe, called the "tubing," which is inserted inside a larger diameter string of pipe, called the "casing." Gas or air is introduced under controlled pressures and volumes into the annular space between the tubing and casing and is injected through suitable gas-lift valves, located at spaced points along the tubing, into the column of oil inside the tubing in order to lift the oil to the surface. Conventional types of injection or gas-lift valves, which are commonly employed for controlling the admission of the lifting gas into the tubing from the annular space, comprise relatively complicated valve structures which are enclosed in suitable housings which, by reason of their construction, must always be mounted at the side of the tubing string and communicate with the interior of the tubing through suitable ports in the wall thereof.

Such conventional gas-lift valves always include a circular valve seat having a central bore or orifice through which the lifting gas passes from the annular space into the valve housing and then into the tubing. A valve disk or plug is arranged to cooperate with the seat to open and close the bore thereof for regulating and controlling the passage of gas therethrough. The movements of the disk or plug are ordinarily controlled by suitable loading mechanism, such as coil springs, or a flexible bellows, or both, which are adapted to provide the necessary loading on the valve disk to control the pressures at which opening and closing of the valve will take place.

Conventional gas-lift valves of the general type described are subject to numerous disadvantages. They are necessarily relatively complicated in construction, requiring a relatively large number of parts, including moving parts. The valve and seat members are subject to a high degree of erosion and cutting out due to the necessarily high velocities of gas passing through the valve, particularly at the initial opening and final closing stages. As a result, conventional valves and seats are made of metal and require highly finished, specially hardened seating surfaces. The bellows and springs are subject to fatigue or other failures and, under the usual operating conditions, provide only relatively small forces for operating the valve.

More importantly, the space limitations inherently imposed by the ordinarily relatively narrow annular space between the casing and tubing into which the valve mechanism must be inserted, since it is mounted at the side of the tubing, necessarily restrict the maximum dimensions of the valve, especially of the diameter of the valve seat orifice, thereby greatly limiting the orifice area of the valve and consequently the rate of flow of lifting gas into the tubing.

Moreover, present valves are all subject, in greater or lesser degree, to the undesirable effect of back pressure of the column of fluid in the tubing acting on the surfaces of the valve closure necessarily exposed thereto.

Still another troublesome condition encountered with conventional gas lift valves results directly from the structural arrangement common to such conventional valves wherein the valve is necessarily mounted at one side of the well tubing and ordinarily must be designed to discharge the lifting gas through an opening in the tubing wall located at one side thereof, so that the incoming jet of gas will usually be caused to impinge on the inner wall of the tubing in a relatively restricted area opposite the inlet port. Due to the high pressure and high velocity of the entering jet of gases, and the frequent presence of sand or other hard particles in the liquid column, considerable erosion of the tubing wall occurs at the area of impingement by the gas which will often cut through the tubing wall or so greatly weaken it that the tubing must be withdrawn and the damaged sections replaced.

In the aforementioned application, there is disclosed a new form of valve which obviates the many disadvantages of more conventional valves enumerated above. My previously disclosed valve embodies a tubular valve element constructed of flexible resilient material concentrically mounted about the exterior of the tubing which is radially expandible and contractible to open and close an annular passageway providing communication between the exterior and interior of the tubing through respective series of circumferentially arranged ports of relatively large area.

The present invention is directed to further improvements in gas lift valves, particularly valves of the general form disclosed in the aforementioned application, whereby additional advantages over existing types of gas lift valves are provided and its operating efficiency and structural form are further enhanced and improved.

The primary object of the present invention is to provide a gas lift valve construction which will eliminate or greatly obviate the several disadvantages inherent in existing types of gas-lift valves.

A principal object of this invention is to provide a valve structure which is concentric with the tubing string to which it is connected.

An important object is to provide a valve structure which includes a tubular valve closure constructed of flexible resilient material which concentrically surrounds the tubing and is radially contractible and expansible for controlling gas admission ports in the tubing.

Another important object is to provide a valve structure having a gas admission port area very much larger than in any existing type of gas lift valve.

A further object is the provision of a valve structure in which the closure elements have no metal-to-metal engaging surfaces.

An additional object is the provision of a valve structure having a tubular closure element for opening and closing the gas admission port to the tubing and an auxiliary check valve means of tubular form adapted to prevent back-flow of fluid from the tubing, both the closure element and the check valve means being constructed of resilient, flexible composition material.

Another object is the provision of a gas-lift valve which is not subject to the back-pressure effect of the column of fluid in the tubing.

Still another object of the present invention is to provide an inlet port arrangement whereby the lifting gas is introduced through a plurality of ports symmetrically arranged about the circumference of the tubing whereby the entering jets of gas impinge on each other generally at the center of the tubing to thereby obviate the erosive effect of the entering gas upon the tubing.

Another object is to provide an improved construction for supportingly engaging the flexible valve element during its contracting stage to prevent deleterious buckling of the valve element.

Other and more specific objects and advantages of the present invention will become more readily apparent from the following detailed description when read in conjunction with the accompanying drawing which illustrates a useful embodiment in accordance with the present invention.

In the drawings:

Fig. 1 is a longitudinal, partly sectional, view of a valve structure in accordance with the present invention showing the valve elements in their fully open positions;

Fig. 2 is a view similar to Fig. 1 showing the valve elements in their fully closed positions;

Fig. 3 is a cross-sectional view taken along line 3—3 of Fig. 1;

Fig. 4 is a view corresponding to Fig. 3 of a slightly modified arrangement of the parts transected by line 3—3;

Fig. 5 is a cross-sectional view taken along line 5—5 of Fig. 1;

Fig. 6 is a cross-sectional view taken along line 6—6 of Fig. 2;

Fig. 7 is a perspective view of one of the valve elements; and

Fig. 8 is a generally diagrammatic view of a portion of a well showing a number of valves installed in a tubing string.

Referring to the drawings, the valve structure therein illustrated is designated generally by the numeral 10, and comprises a tubular body 11, normally having the same dimensions as the tubing string 12 (Fig. 8) into which it is to be inserted. The upper and lower ends of the body are provided with externally threaded end sections 13—13 by means of which the body may be coaxially connected to adjacent sections of tubing string 12, as by means of conventional screw collars 14 (Fig. 8). Adjacent one end thereof, body 11 is provided with a plurality of ports 15 extending generally radially through the wall of the body and symmetrically spaced apart about the circumference of the body and forming gas-admission passageways to the tubing string.

Ports 15 may be directed inwardly and upwardly at an angle to the axis of the tubing string or may be disposed in a horizontal plane. In either position, the radial arrangement of the ports 15 will cause the entering jets of gas to impinge upon each other at substantially the longitudinal axis of the tubing string, as best indicated by the arrows in Figs. 3 and 4. The mutual impingement of the jets upon each other will prevent direct impingement of any jet upon the opposite portion of the wall of the tubing and thereby greatly obviate or completely prevent erosive action of the jet on the tubing wall. By directing the ports 15 upwardly, as shown in Figs. 1 and 2, the jets of gas flowing through the ports will still impinge upon each other and will, at the same time, have an upwardly directed velocity component which will aid in lifting the fluid column in the tubing.

It will be understood that the number of ports 15 may be varied as desired. Three ports spaced 120° apart are shown in Figs. 1, 2 and 3. Fig. 4 illustrates a modification employing two diametrically opposed ports 15a.

A tubular housing 16 of somewhat larger diameter than body 11 is concentrically disposed about the exterior of body 11 to define an annular space between the body and the housing forming a valve chamber 17 for enclosing the valve mechanism to be subsequently described. Ports 15 are termed the outlet ports for valve chamber 17. The upper end of housing 16 extends along body 11 to a point somewhat above ports 15 and valve chamber 17 and is closed at its upper end by means of a tubular bushing 18 which surrounds body 11 and extends into the upper end of chamber 17, being provided with a downwardly facing external shoulder 18a abutting the upper end of housing 16. Bushing 18 is provided with internal threads 19 adjacent its upper end to threadedly engage threads 13 of the body. An annular packing 20, such as a conventional O-ring, is arranged between the outer wall of bushing 18 and the adjacent portion of the wall of housing 16 to seal therebetween. One or more packing rings 21, also preferably of the O-ring type, are disposed in sealing engagement between the inner wall of bushing 18 and body 11 above ports 15.

The opposite or lower end of chamber 17 is closed by means of a tubular bushing 22 which extends slidably into the lower end of housing 16 and is provided with an upwardly facing external shoulder 22a which is adapted to abut against the lower end of housing 16. The external diameter of the portion of bushing 22 which extends into the interior of housing is reduced to form an upwardly projecting annular boss 23, the reduction in diameter forming an upwardly facing shoulder 24 between the exterior of boss 23 and the opposite portion of the wall of housing 16. A seal ring 25 is disposed in sealing engagement between the exterior of bushing 22 and the inner wall of housing 16 intermediate shoulders 22a and 24. The inner diameters of bushing 22 and boss 23 are made somewhat larger than the external diameter of the adjacent portion of body 11 to define an annular passageway 26 therebetween.

A second tubular housing section 27 surrounds body 11 below bushing 22 and has its upper end secured to bushing 22 in a suitable manner. Section 27 is larger in diameter than body 11 and defines an annular chamber 28 about the exterior of body 11 below bushing 22, chamber 28 being in open communication with passageway 26. The lower end of chamber 28 is closed by means of a suitable closure ring 29 which may be integral with the lower end portion of section 27. Seal rings 30 are disposed between the exterior of body 11 and the adjacent portion of the bore of ring 29 to form a fluid-tight seal therebetween. A filler opening 31 extends through closure ring 29 and is fitted with an inwardly opening check valve 32, of any suitable and generally conventional construction, adapted to permit the introduction of pneumatic pressure fluid into chamber 28 while automatically preventing the escape of such fluid from the chamber. A nut 33 is screwed over threaded section 13 on the lower end of body 11 and is adapted to bear against the lower end of closure ring 29 to thereby urge housing section 27 upwardly against bushing 22. A lock nut 34 is screwed on section 13 to lock nut 33 in its compressive position against the lower end of housing section 27.

An elongated tubular sleeve valve 35 is coaxially disposed in chamber 17 surrounding a portion of body 11. Sleeve 35 is constructed of any suitable flexible resilient material, such as synthetic rubber or the like, preferably of oil-resistant character, and has a wall thickness generally less than the width of chamber 17. The lower end of sleeve valve 35 rests on shoulder 24 and is tightly secured between the exterior of boss 23 and the opposing portion of the wall of housing 16. The upper end of sleeve valve 35 is tightly secured to the exterior of body 11 by means of a collar 36 having a downwardly projecting annular flange 37 which extends about the exterior of the upper end of sleeve valve 35 and engages the wall of housing 16. A plurality of angularly spaced passageways 38 extend longitudinally of flange 37 and collar 36 providing communication between the portions of chamber 17 above and below collar 36 and exteriorly of sleeve valve 35. Collar 36 is locked to body 11 by means of a suitable lock ring 39. A seal ring 40 is disposed in sealing engagement between collar 36 and body 11 above the upper end of sleeve valve 35. Flange 37 extends above the upper end of collar 36 which forms an upwardly facing shoulder 36a between body 11 and the upper portion of flange 37.

A tubular check valve, indicated at 41, is mounted in the upper end of chamber 17 and surrounds a portion of body 11 between ports 15 and sleeve valve 35. Check valve 41 comprises a tubular body portion 42 composed of flexible resilient material, such as rubber and the like, and has an upwardly and outwardly flaring flexible lip portion 43, the outer end of which is normally in sealing engagement with the inner wall of housing 16. Body portion 42 is seated on shoulder 36a and is secured to body 11. A packing ring 44 is disposed between body 11 and body portion 42 of the check valve.

A plurality of vertically spaced transversely slotted openings 45 are cut through the wall of housing 16 to provide communication between chamber 17 and the exterior of the housing. Several groups of the openings 45 are provided in circumferentially spaced apart relation about housing 16 and will ordinarily be uniformly spaced. In the illustrative embodiment three groups of openings 45 are showing spaced 120° apart. The number of openings, the number of groups and their spacing may be varied as desired. The openings 45 are located longitudinally along housing 16 intermediate the ends of sleeve valve 35 and constitute inlet ports to chamber 17 for entrance of lifting gas from the exterior of housing 16.

Between the lower portion of sleeve valve 35 and body 11 there is mounted a collar 46 (see Fig. 7) which extends into the upper end of passageway 26 between body 11 and boss 23. Collar 46 is provided with an external downwardly tapered annular flange 47 which is adapted to fit snugly over the upper end of boss 23, as shown. A plurality of channels 48 are cut or formed longitudinally in the inner wall of collar 46 (see Figs. 5, 6 and 7) to provide communication between passageway 26 and the space between the interior of sleeve valve 35 and the exterior of body 11. The exterior surface of collar 46 is provided with a plurality of radial projections 49 which are preferably rounded, as shown, but may be of any other suitable shape. Projections 49 are provided to modify the external shape of collar 46 so as to extend or lengthen the outer periphery of collar 46 to a circumferential length which will be substantially equal to the nominal internal circumference of sleeve valve 35 in its unstressed condition, and will normally be disposed opposite openings 45. The function of this construction of collar 46 will be explained in greater detail hereinafter.

The above-described valve is operated in the following manner: Before being installed in tubing string 12, chamber 28 is charged with a pneumatic fluid, such as air or gas, through filler opening 31 to a pre-determined operating pressure. This gas under pressure will flow through passageway 26 and channels 48 into the space between sleeve valve 35 and body 11. Since the ends of the sleeve valve are sealed, as described above, this gas will be trapped beneath sleeve valve 35 and the pressure of the gas will tend to expand sleeve valve 35 radially and circumferentially toward openings 45. It will be evident that so long as the pressure on the exterior of sleeve valve 35 is less than the predetermined internal pressure of the pneumatic fluid in chamber 28, the sleeve valve will be maintained in expanded position and will be forced against the inner wall of housing 16 over openings 45 and form a tight closure therewith, thereby preventing the entrance of lifting gas into valve chamber 17 from the exterior of the valve. This will constitute the closed position of the valve, as illustrated particularly in Figs. 2 and 5.

The valve 10 being thus pre-set to the desired operating pressure by the gas introduced into chamber 28, will then be installed in tubing string 12 and lowered into a well 50 (Fig. 8), having a casing 51 of larger diameter than the tubing. As indicated in Fig. 8, and in accordance with conventional practice, a plurality of such valves will normally be installed at longitudinally spaced points along the tubing string. The several valves will be set at desired operating pressures. The lower end of the tubing may be provided with a screen 52 and the annular space 53 between the tubing and the well casing may be sealed off above the screen by means of a conventional packer 54. It will be understood that when the tubing string, having the lift valves installed therein, is inserted in the well, oil or other formation liquid will enter the bottom of the tubing string and will rise in the interior thereof to whatever height it may be forced by the natural pressure existing in the oil producing formation. Where the natural pressure is insufficient to cause the well to flow naturally, a gas-lift system may be employed to inject lifting gas into the liquid column inside the tubing to lift the fluid to the surface and cause the well to flow.

In accordance with conventional practice, gas or air (herein referred to as "gas" generally), in sufficient volume and at suitable pressures, will be introduced at the surface into annular space 53 to operate the several valves for the purpose of injecting the gas into the column of fluid inside the tubing. The manner in which such a series of valves operate generally is well understood in the art. For present purposes the operation of a single valve in accordance with this invention will be described in order to illustrate its mode of operation. While the pressure in annular space 53 is still below the opening pressure of the valves, the column of fluid inside the tubing string and above a particular valve will be prevented from flowing out or back through the gas lift valves, in accordance with the present invention, by means of check valve 41. It will be seen that any fluid inside the tubing string above ports 15 will tend to flow out of the tubing into valve chamber 17. However, this fluid will flow into the outwardly flared open upper end of the check valve 41 and the hydrostatic pressure of the fluid will expand lip 43 outwardly into sealing engagement with the wall of housing 16 (Fig. 2), thus effectively preventing the backward flow of this fluid. The greater the head of fluid applied to the check valve, the tighter will be the seal thus formed.

As soon as the pressure of the gas in annular space 53 exerted on the area of sleeve valve 35 covering openings 45 exceeds the pre-set pressure on the opposite side of the sleeve valve, as exerted by the loading gas in chamber 28, the sleeve valve will be forced inwardly away from openings 45 and the gas from annular space 53 will flow through openings 45 into valve chamber 17 and will flow upwardly through passageways 38 therein past the outside of check valve 41 and thence through ports 15 into the interior of body 11 and into the column of fluid standing inside the tubing string. The force and volume of gas thus introduced will blast or lift the column of fluid standing above the valve to the surface and expel it from the tubing. The fully open position of the valve is shown in Figs. 1 and 6. As soon as the pressure of the gas in the annular space falls below the pre-set closing pressure on the sleeve valve the latter will close and check valve 41 will prevent any back flow of fluid from the tubing, the ports of the valve again assuming the positions shown in Fig. 2.

As will be seen from the foregoing, when sleeve valve 35 opens, an annular orifice for admission of the injection gas is formed which has an area equal to the area of the annular space between the exterior of sleeve valve 35 and the inner wall of housing 16. In the present valve this area will be from 10 to 20 times as great as the port area which it is possible to obtain with conventional valves of the same nominal size, thereby providing greatly improved operating efficiency.

By way of contrast, a valve in accordance with the present invention, adapted for installation in standard tubing having a standard nominal two-inch diameter, will have a gas admission orifice area in fully open position of approximately 1.3 square inches whereas, standard conventional valves for the same installation will have orifice areas in fully open position of from approximately 0.07 square inch to about 0.13 square inch.

By selection of an appropriate volume for chamber 28, the change in volume resulting from the flexing of sleeve valve 35, is practically negligible.

Accordingly, the present valve opens and closes substantially instantaneously as the pressure, respectively exceeds or falls below the pre-set pressure of the valve so that there will be minimum wastage of lifting gas. Also, since the valve closure is constructed of resilient composition material, such as rubber, it will be substantially unaffected by the erosive or corrosive action of the stream of gas and the valve will be substantially free from mechanical friction in its operation. The concentric construction of the valve in accordance with the present invention, permits the insertion into the annular space of various types of fishing tools, such as "overshots," wash-over pipes and the like, when necessary in connection with fishing operations conducted while the tubing is in the well. The described concentric construction also permits the tubing string, with the valves in place, to be withdrawn through conventional pipe wipers, a condition which is not readily possible with more conventional valves because of their off-set or eccentric mounting on the tubing.

Further the concentric arrangement of the valve of the present invention about the tubing enables positioning inlet ports 15 symmetrically about body 11, as described, thereby providing uniformly distributed and balanced flow into the tubing along with the previously mentioned important feature of causing the incoming jets of gas to impinge upon each other rather than upon the wall of body 11.

With further reference to collar 46 and its unique shape, it is found that when a tubular resilient sleeve, such as sleeve valve 35, is expanded by internal pressure the body of the valve will expand radially and circumferentially in a substantially uniform manner and its internal and external diameters will likewise stretch uniformly and in its stretched or expanded condition sleeve valve 35 will have smooth circular inner and outer surfaces. However, when such a tubular resilient body is circularly collapsed by external pressure, while the exterior of the body may retain a substantially smooth external surface, the inner surface will necessarily be reduced in diameter. This reduction in diameter cannot occur uniformly, but will necessarily buckle or wrinkle to accommodate the flow and displacement of the plastic material composing the body, particularly if the inner wall of the sleeve is unsupported. Hence, in a resilient sleeve valve structure of the form described, the repeated expansion and contraction of the valve will result in repeated buckling and flexing of the inner wall of the sleeve, resulting in excessive fatigue and, ultimately, splitting or rupturing of the sleeve.

By providing collar 46 with an outer periphery shaped to provide a circumferential length which is substantially equal to the normal preformed internal circumference of the sleeve valve, the described buckling or wrinkling of the sleeve during contraction and the attendant disadvantages thereof are eliminated. As may best be seen in Fig. 6 when sleeve valve 35 is contracted the valve body will be collapsed against the exterior surface of collar 46. Since the peripheral length of the latter is made substantially equal to the inner circumference of the sleeve valve in its unstressed condition, the sleeve valve will collapse about the exterior of collar 46 without developing any substantial circumferential strains in the sleeve valve body. As a result sleeve 35 may be kept in operation for long periods without damage.

It will be understood that numerous variations and modifications may be made in the details of the illustrative embodiment within the scope of the appended claims but without departing from the principles of this invention.

What I claim and desire to secure by Letters Patent is:

1. A gas lift valve, comprising, a tubular body adapted for co-axial insertion in a pipe string, an annular casing about the body defining an annular valve chamber concentrically surrounding said body, said casing and body having longitudinally spaced inlet and outlet port means communicating respectively with the exterior of said chamber and the interior of said body, a tubular valve member constructed of flexible resilient material co-axially mounted in said valve chamber, means securing one end of said valve member in sealing engagement with said body between said inlet and outlet port means, means securing the opposite end of said valve member in sealing engagement with said casing at a point spaced from said inlet port means and on the opposite side of said inlet port means from said outlet port means, said valve member being formed to engage said casing at said inlet port means, which is intermediate the ends of said valve member, said valve member being annularly expansible and contractible to control the passage of fluid through said chamber between said ports, an annular support member disposed between said body and said valve member and being also disposed opposite said inlet port means and between said means securing said valve member to said body and said casing, said support member having a non-circular external periphery having a circumferential length substantially equal to the nominal unstressed internal circumference of said valve member, and means including a gas-charged chamber communicating with the valve chamber interiorly of the valve member for maintaining a pre-determined pneumatic pressure on the side of the valve member adapted to normally urge the same away from said support member to an expanded valve-closing position.

2. In a gas lift valve as defined by claim 1, a tubular check valve means annularly disposed in said valve chamber intermediate said port means and between said outlet port means and the end of said valve member secured to said body, said check valve means being adapted to prevent the return flow of fluid from said outlet port means to said inlet port means.

3. In a gas lift valve, an annular valve member constructed of flexible resilient material adapted to be annularly expanded and contracted in use, and an annular support member concentrically disposed within the bore of said valve member, the external periphery of said support member being non-circular in shape and having a circumferential length substantially equal to the nominal unstressed internal circumference of said valve member, said support member having a plurality of radially spaced longitudinally extending curved projections, said projections being at one end connected to an annular flange on said support member of an external diameter substantially equal to the internal diameter of the valve member, said projections being of a maximum radial dimension substantially equal to the external diameter of said flange and at their opposite ends convexly curving to a diameter substantially less than said internal diameter of said valve member, said support member being reduced in diameter and substantially cylindrical in configuration between said projections, said valve member being normally spaced from said reduced portions of said support member.

4. A gas lift valve comprising: an elongate central body member; a casing surrounding said body member and spaced therefrom and having its opposite ends closed to define an annular chamber therein surrounding said central body member, said casing and body member having longitudinally spaced inlet and outlet port means, respectively, communicating with the annular chamber; an elongate tubular valve member constructed of flexible resilient material mounted in said chamber; means securing one end of said valve member in sealing engagement with said central body member between said inlet and outlet port means, means securing the opposite end of said valve member in sealing engagement with said casing at a point spaced from said inlet port means and on the side of said inlet port means opposite said outlet port means, said elongate flexible resilient valve member being formed to engage the casing at said inlet port means intermediate the ends of said valve member; means for maintaining a predetermined pneumatic pressure in the chamber and acting on the valve member on the side thereof opposite the inlet port means of the casing to normally maintain said valve member in engagement with said casing at said inlet port means to close said port means; said central body member having thereon means providing a plurality of radially spaced longitudinally extending curved projections and an annular flange of a diameter substantially equal to the internal diameter of the valve member, said curved projections being of a radial dimension substantially equal to the diameter of said flange and at one end extending longitudinally from said flange and being disposed within the valve member at a position substantially opposite the inlet port means in the casing, the ends of said longitudinally extending curved projections opposite said flange curving convexly to a diameter substantially less than said internal diameter of said valve member, said central body member having means providing a substantially cylindrical configuration of diameter less than the diameter of said flange between said projections, said valve member when maintained in engagement with the casing being spaced from said reduced cylindrical portions on said body member; said pneumatic pressure normally urging said valve member away from said longitudinally extending curved projections; said valve member being annularly flexible to control the passage of fluid through said chamber between said inlet port and said outlet port means.

References Cited in the file of this patent

UNITED STATES PATENTS

| | | |
|---|---|---|
| 932,934 | Wood | Aug. 31, 1909 |
| 1,739,041 | Ragland | Dec. 10, 1929 |
| 2,118,428 | Chrisman | May 24, 1938 |
| 2,622,620 | Annin | Dec. 23, 1952 |
| 2,706,612 | Ratelband | Apr. 19, 1955 |
| 2,766,765 | Bolanowski et al. | Oct. 16, 1956 |